US012665850B2

(12) United States Patent
Chaney et al.

(10) Patent No.: US 12,665,850 B2
(45) Date of Patent: Jun. 23, 2026

(54) LOAD DISTRIBUTION AND HIGH AVAILABILITY OVER ETHERNET ADVANCED PHYSICAL LAYER

(71) Applicant: Schneider Electric Systems USA, Inc., Foxborough, MA (US)

(72) Inventors: Richard Allan Chaney, Canterbury, NH (US); Mark V. Bertolina, Milton, MA (US); Briane Ritchie, Bellingham, MA (US); Larry K. Brown, Casper, WY (US)

(73) Assignee: SCHNEIDER ELECTRIC SYSTEMS USA, INC., Foxborough, MA (US)

( * ) Notice: Subject to any disclaimer, the term of this patent is extended or adjusted under 35 U.S.C. 154(b) by 77 days.

(21) Appl. No.: 18/483,969

(22) Filed: Oct. 10, 2023

(65) Prior Publication Data

US 2024/0121195 A1 Apr. 11, 2024

Related U.S. Application Data

(60) Provisional application No. 63/414,801, filed on Oct. 10, 2022.

(51) Int. Cl.
*H04L 12/24* (2006.01)
*H04L 12/10* (2006.01)
*H04L 41/0803* (2022.01)
*H04L 47/125* (2022.01)
*H04L 67/12* (2022.01)

(52) U.S. Cl.
CPC ............ *H04L 47/125* (2013.01); *H04L 12/10* (2013.01); *H04L 67/12* (2013.01)

(58) Field of Classification Search
CPC ....... H04L 47/125; H04L 12/10; H04L 67/12; H04L 49/351
USPC ......................................................... 709/238
See application file for complete search history.

(56) References Cited

U.S. PATENT DOCUMENTS

| | | | |
|---|---|---|---|
| 2002/0083364 A1 | 6/2002 | Christensen et al. | |
| 2012/0102217 A1* | 4/2012 | Cardona ............. | G06F 9/45558 709/238 |
| 2013/0080510 A1* | 3/2013 | Leftik ................. | H04L 67/1008 709/203 |
| 2018/0109446 A1* | 4/2018 | Srinivasan ............. | H04L 45/28 |
| 2018/0120796 A1* | 5/2018 | Tegnell ............. | G05B 19/0421 |
| 2018/0375363 A1 | 12/2018 | Wienhold et al. | |
| 2019/0280926 A1 | 9/2019 | Mikis et al. | |

(Continued)

FOREIGN PATENT DOCUMENTS

| | | |
|---|---|---|
| DE | 102021106808 A1 | 9/2022 |
| WO | 2022182771 A1 | 9/2022 |

OTHER PUBLICATIONS

International Search Report and Written Opinion from PCT Application No. PCT/US2023/034837, dated Jan. 22, 2024, 13 pages.

*Primary Examiner* — Moustafa M Meky
*Assistant Examiner* — Elizabeth Kassa
(74) *Attorney, Agent, or Firm* — Stinson LLP

(57) ABSTRACT

An Ethernet Advanced Physical Layer (Ethernet-APL) bridge system between an edge field device and an industrial network. The bridge system includes at least one Ethernet-APL switch and a plurality of redundant physical Ethernet-APL 10BaseT1L ports coupled to the at least one switch providing improved load distribution and high availability.

18 Claims, 3 Drawing Sheets

(56)     References Cited

U.S. PATENT DOCUMENTS

| | | | |
|---|---|---|---|
| 2020/0387146 A1* | 12/2020 | Nixon | G05B 19/41845 |
| 2021/0081346 A1* | 3/2021 | Nixon | G06F 13/4027 |
| 2021/0181701 A1* | 6/2021 | Mathews | G05B 19/0423 |
| 2021/0227630 A1 | 7/2021 | Hofmeister et al. | |
| 2022/0075352 A1* | 3/2022 | Nixon | H04L 67/125 |
| 2022/0078267 A1* | 3/2022 | Nixon | G05B 19/4186 |
| 2022/0128976 A1* | 4/2022 | Nixon | G05B 19/4183 |
| 2022/0224108 A1* | 7/2022 | Doynov | G01R 31/12 |
| 2023/0006864 A1 | 1/2023 | Gottron et al. | |
| 2023/0412406 A1* | 12/2023 | De Bruijn | H04L 12/40045 |
| 2024/0022524 A1* | 1/2024 | Bibernell | G05B 19/042 |
| 2024/0053728 A1* | 2/2024 | Jung | G05B 19/4155 |

* cited by examiner

LOAD DISTRIBUTION AND HIGH AVAILABILITY OVER ETHERNET ADVANCED PHYSICAL LAYER

CROSS-REFERENCE TO RELATED APPLICATION

This application claims priority to U.S. Provisional Patent Application No. 63/414,801, filed Oct. 10, 2022, the entire disclosure of which is incorporated herein by reference.

FIELD

The present disclosure relates generally to industrial assets, and more particularly, to systems and methods relating to load distribution and high availability over Ethernet Advanced Physical Layer (Ethernet-APL), which is a specific single-pair Ethernet (SPE) based on 10BASE-T1L.

BACKGROUND

As is known, an industrial operation or plant typically includes industrial equipment often in a variety of forms and associated with various processes, for example, depending on the industrial operation. For example, an industrial operation may include one or more field devices (e.g., remote terminal units (RTUs), programmable logic controllers (PLCs), actuators, sensors, human-machine interfaces (HMIs)) that are used perform, analyze and/or control process variable measurements. These process variable measurements may include pressure, flow, level, and temperature, for example. The industrial operation or plant, and its associated equipment and process(es), are in some instances operated and controlled using a Distributed Control System (DCS).

Currently, network elements such as routers and switches are needed to provide load balancing schemes for ensuring even distribution of traffic between network endpoints with multiple paths between them and the network element. Moreover, field wiring, connectors, and the physical hardware components adjacent to the network interface face a much higher likelihood of being damaged by workers, electrostatic discharge (ESD), electromagnetic interference (EMI), lightning, and the like. Once these connections are damaged, the field device is no longer functional and must be replaced immediately.

Conventional methods and systems for load distribution and availability have generally been considered satisfactory for their intended purpose. However, there is still a need in the art for improvements. The present disclosure provides solutions for this need.

SUMMARY

Aspects of the present disclosure provide improved load distribution and high availability over Ethernet-APL.

In an aspect, an Ethernet-APL bridge system provides communication between an edge field device and an industrial network. The bridge system includes at least one Ethernet-APL switch and a plurality of redundant physical Ethernet-APL 10BaseT1L ports coupled to the at least one switch. The redundant ports connect the field device to the industrial network via the at least one switch to enable a local operation of the field device. In response to a failure of one of the plurality of redundant ports, the field device is capable of continuing the local operation using at least one other one of the redundant ports due to the port redundancy.

In another aspect, a field device includes a controllable element for performing a local operation and a plurality of redundant physical Ethernet-APL 10BaseT1L ports coupled to at least one Ethernet-APL switch. The redundant ports connect the field device to an industrial network via the at least one switch to enable the local operation of the field device. In response to a failure of one of the plurality of redundant ports, the field device is capable of continuing the local operation using at least one other one of the redundant ports due to the port redundancy.

In yet another aspect, a method provides high availability and load distribution in an intrinsically safe edge field device communicating with an industrial network. The method includes connecting the field device to a plurality of redundant Ethernet-APL ports, coupling each of the redundant ports to the industrial network via at least one Ethernet-APL switch, and enabling a local operation of the field device. In response to a failure of one of the plurality of redundant ports, the method includes continuing the local operation of the field device using at least one other one of the redundant ports due to the port redundancy.

Other objects and features of the present invention will be in part apparent and in part pointed out herein.

BRIEF DESCRIPTION OF THE DRAWINGS

Corresponding reference characters indicate corresponding parts throughout the drawings.

DETAILED DESCRIPTION

The features and other details of the concepts, systems, and techniques sought to be protected herein will now be more particularly described. It will be understood that any specific embodiments described herein are shown by way of illustration and not as limitations of the disclosure and the concepts described herein. Features of the subject matter described herein can be employed in various embodiments without departing from the scope of the concepts sought to be protected.

As described above, field wiring, connectors, and the physical hardware components adjacent to the network interface of a field device are susceptible to damaged, which renders the field device unusable. Advantageously, aspects of the present disclosure provide redundancy such that if one port becomes non-functional, the field device will continue to function. In an embodiment, the field device indicates that maintenance is required while it continues to operate. Maintenance can be then scheduled at a convenient time in the future without immediately disrupting plant operations. In this regard, aspects of the present disclosure permit high availability field devices.

Figure 1:
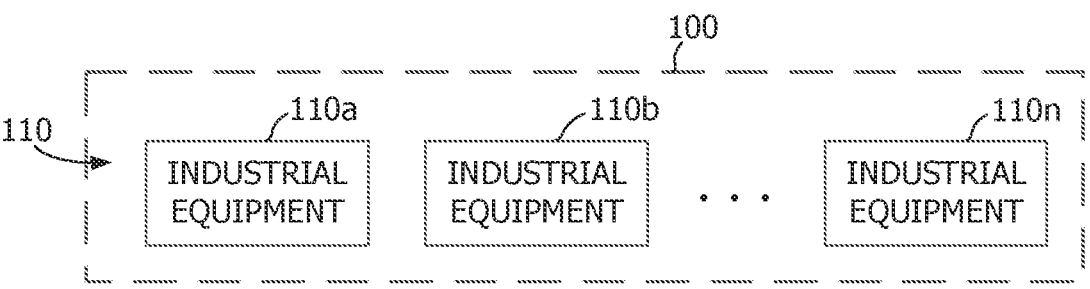
FIG. 1 illustrates an example industrial operation in accordance with embodiments of the disclosure.

Referring to FIG. 1, an example industrial operation 100 in accordance with embodiments of the disclosure includes a plurality of industrial devices, or equipment, 110a, 110b, . . . , 110n (indicated collectively as industrial equipment 110). The industrial equipment (or devices) 110 may be associated with a particular application (e.g., an industrial application), applications, and/or process(es). The industrial equipment 110 may include electrical or electronic equipment, for example, such as machinery associated with the industrial operation 100 (e.g., a manufacturing or natural resource extraction operation). The industrial equipment 110 may also include the controls and/or ancillary equipment associated with the industrial operation 100, for example, field devices (e.g., RTUs, PLCs, actuators, sensors, HMIs) that are used perform, analyze and/or control process variable measurements. In embodiments, the industrial equipment 110 may be installed or located in one or more facilities (i.e., buildings) or other physical locations (i.e., sites) associated with the industrial operation 100. The facilities may correspond, for example, to industrial buildings or plants. Additionally, the physical locations may correspond, for example, to geographical areas or locations.

The industrial equipment 110 may each be configured to perform one or more tasks in some embodiments. For example, at least one of the industrial equipment 110 may be configured to produce or process one or more products, or a portion of a product, associated with the industrial operation 100. Additionally, at least one of the industrial equipment 110 may be configured to sense or monitor one or more parameters (e.g., industrial parameters) associated with the industrial operation 100. For example, industrial equipment 110a may include or be coupled to a temperature sensor configured to sense temperature(s) associated with the industrial equipment 110a, for example, ambient temperature proximate to the industrial equipment 110a, temperature of a process associated with the industrial equipment 110a, temperature of a product produced by the industrial equipment 110a, etc. The industrial equipment 110a may additionally or alternatively include one or more pressure sensors, flow sensors, level sensors, vibration sensors and/or any number of other sensors, for example, associated the application(s) or process(es) associated with the industrial equipment 110a. The application(s) or process(es) may involve water, air, gas, electricity, steam, oil, etc. in one example embodiment.

The industrial equipment 110 may take various forms and may each have an associated complexity (or set of functional capabilities and/or features). For example, industrial equipment 110a may correspond to a "basic" industrial equipment, industrial equipment 110b may correspond to an "intermediate" industrial equipment, and industrial equipment 110n may correspond to an "advanced" industrial equipment. In such embodiments, intermediate industrial equipment 110b may have more functionality (e.g., measurement features and/or capabilities) than basic industrial equipment 110a, and advanced industrial equipment 110n may have more functionality and/or features than intermediate industrial equipment 110b. For example, in embodiments industrial equipment 110a (e.g., industrial equipment with basic capabilities and/or features) may be capable of monitoring one or more first characteristics of an industrial process, and industrial equipment 110n (e.g., industrial equipment with advanced capabilities) may be capable of monitoring one or more second characteristics of the industrial process, with the second characteristics including the first characteristics and one or more additional parameters. It is understood that this example is for illustrative purposes only, and likewise in some embodiments the industrial equipment 110a, 110b, 110n, etc. may each have independent functionality.

As described above, the industrial operation 100, and its associated equipment and process(es), may be operated and controlled using a DCS in some instances.

Figure 2:
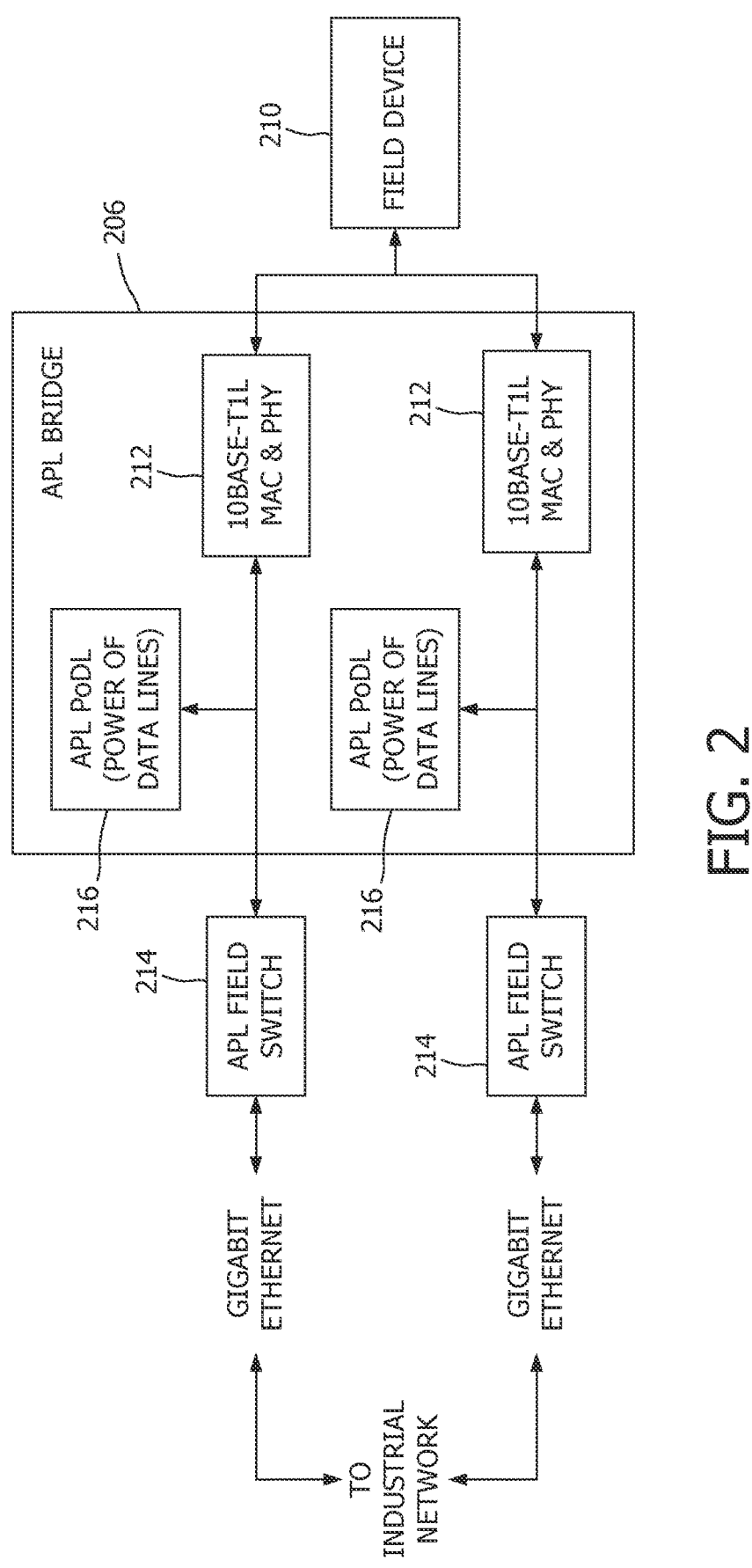
FIG. 2 illustrates an example Ethernet-APL bridge in accordance with embodiments of the disclosure.

FIG. 2 shows an example Ethernet-APL bridge 206 in accordance with embodiments of the present disclosure. The APL bridge 206 provides communication between industrial equipment 110 (i.e., an edge field device 210 in the illustrated embodiment) and an industrial network, such as the DCS mentioned above. The APL bridge 206 includes two or more physical APL 10BaseT1 ports 212. Each port 212 connects the field device 210 to the industrial network via an APL switch 214. In addition, APL bridge 206 includes Power over Data Lines (PoDL) components indicated at 216 for receiving power from APL switch 214. The APL switch 214 and PoDL components 216 (as well as network port, cable, and on-board network interface components (not shown)) are duplicated for each APL port 212. In an embodiment, each APL port 212 connects to its corresponding APL switch 214 via 2-wire intrinsically safe Ethernet (2-WISE) 10BASE-T1L. Redundant APL ports 212 and the network interface components may be targeted for use in both ordinary and hazardous locations. The APL switch 214 in FIG. 2 combines communication technology with Ethernet-APL and permits transmitting power and data on an Ethernet wire into hazardous areas of a process plant. In a hazardous environment, power to field device 210 is limited to an intrinsically safe threshold to reduce the risk of fire, explosions, or the like.

The APL port 212, for example, comprises an ultra low power, single port, 10BASE-T1L transceiver configured for long reach, 10 Mbps SPE and includes an integrated media access control (MAC) interface enabling direct connectivity with a variety of host controllers via a 4-wire serial peripheral interface (SPI). In an embodiment, an ADIN1110 transceiver available from Analog Devices embodies a suitable port 212.

The APL bridge 206 shown in FIG. 2 permits active load sharing or distribution over APL to the Edge via multiple active APL ports 212 to a single field device 210. The disclosed APL bridge 206 allows physical separation of application interfaces on a single embedded device and can be configured to distribute I/O loading between physically separated networks and interfaces from the same or multiple applications. In this manner, APL bridge 206 extends the concepts of load balancing and physical separation of critical application traffic (i.e., Control traffic vs. Admin or Configuration traffic) to constrained field devices such as field device 210 connected over Ethernet-APL to an industrial network. For physical separation, each APL port 212 receives a unique MAC address and, therefore, a unique IPv4 or IPv6 Ethernet address. The distributor functions then assign critical applications to a specific APL port 212 independently (assignments may be user-specified or automated based on priority of associated traffic as specified by traffic type).

In an example implementation, the requirements for load distribution include at least one of: automatic load balancing, equal distribution of traffic flows for redundant connections, traffic prioritization by traffic type (e.g., Admin vs. Control vs. measurement I/O), traffic separation by application, and operation independent of any high availability scheme.

The field device 210 comprises an Intrinsically Safe Edge Field Device with redundant APL port and network interface components in accordance with embodiments of the present disclosure. Advantageously, complete port redundancy as illustrated in FIG. 2 also significantly increases availability and allows for continued operation of an Intrinsically Safe Edge Field Device, such as field device 210, during failure of one of the ports 212. In an embodiment, port 212 comprises an active standby port on APL (T1L SPE) with fast failover, which achieves high availability with rapid, near seamless failover. In another embodiment, port 212 comprises a passive standby port on APL (T1L SPE) with failover, which achieves high availability with failover capability. In both instances, redundant wiring and the physical layer APL port interface are provided to mitigate the risk of wiring, ESD, and EMC failures or the like on the active port 212.

Aspects of the present disclosure include two possible software configurations for load balancing and high availability: 1) Active-Active; and 2) Active-Passive. Each case takes advantage of the hardware redundancy. For instance, Active-Active provides zero fail-over time and allows load balancing and Active-Passive provides minimum fail-over time as the passive port can function as a "Hot Standby" that is periodically validated.

Figure 3:
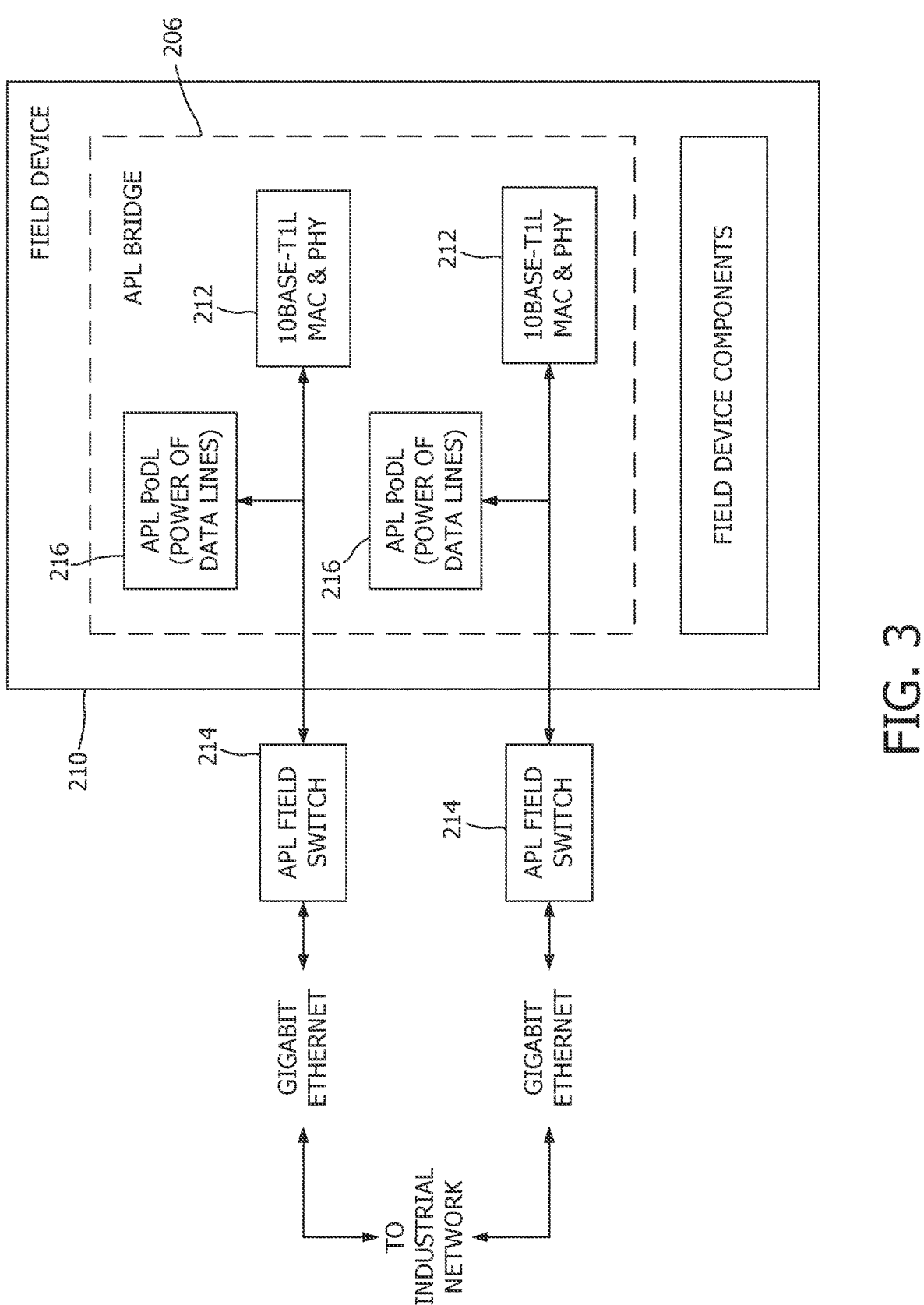
FIG. 3 illustrates an example field device having an Ethernet-APL bridge in accordance with embodiments of the disclosure.

FIG. 3 illustrates an alternative embodiment in which APL bridge 206 is integrated within field device 210 and has the features described above with respect to FIG. 2 in addition to field device components, which include a processor and a controllable element for performing a local operation in at least one embodiment.

In an embodiment, an intrinsically safe edge field device provides high availability. The IS edge field device comprises two or more redundant physical Advanced Physical Layer (APL) 10BaseT1 ports and at least one APL switch, network port, cable, on-board network interface component, and Power over Data Lines component for each of the two or more physical APL ports. In in response to a failure of one of the two or more redundant physical APL 10BaseT1 ports, the IS edge field device is capable of continuing operation using at least one other one of the two or more redundant physical APL 10BaseT1 ports due to the complete port redundancy. The complete port redundancy significantly increases availability of the IS edge field device. The IS edge field device is configured to provide an indication of the failure while it continues to operate. This indication allows for maintenance to be scheduled at a convenient time in the future without immediately disrupting plant operations. In a further embodiment, the IS edge field device comprises at least two possible software configurations, with each of the at least two possible software configurations taking advantage of the hardware redundancy. The at least two possible software configurations include (1) Active-Active and (2) Active-Passive software configurations. The Active-Active software configuration provides zero fail-over time and allows load balancing, and the Active-Passive software configuration provides minimum failover time as the Passive port is actually a "Hot Standby" that is periodically validated.

For convenience, certain introductory concepts and terms used in the specification are collected here.

As used herein, the term "Edge" is used to refer to Layer 0 of the Purdue Network Model for Industrial Control Systems.

As used herein, the term "Field Device" is used to refer to Equipment that is connected to the field side on an industrial control system. Types of field devices include RTUs, PLCs, actuators, sensors, HMIs, and associated communications as well as intelligent field instruments with embedded Control/Compute/measurement capability implemented on lower power embedded Microcontroller based platforms.

As used herein, the term "Machine Learning (ML)" is used to refer to the use and development of software that is able to learn and adapt without following explicit instructions, by using algorithms and statistical models to analyze and draw inferences from patterns in data.

As used herein, the term "Embedded Device" is used to refer to a combination of a microcontroller, memory, and input/output peripherals—that has a dedicated function within a larger system.

As used herein, the term "Networked" is used to refer to connected via Ethernet.

As used herein, the term "High availability" is used to refer to a device or application that can operate at a high level, continuously, without intervention, for a given time period. High-availability infrastructure is configured to deliver quality performance and handle different loads and failures with minimal or zero downtime.

As used herein, the term "Intrinsically Safe (IS)" is used to refer to an approach to the design of equipment going into hazardous areas that reduces the available energy to a level where it is too low to cause ignition as certified by per IEC TS 60079-39 or ATEX.

It is to be understood that aspects of the present disclosure may be found suitable for use in numerous applications, including but not limited to Oil and Gas, Energy, Food and Beverage, Water and Wastewater, Chemical, Petrochemical, Pharmaceutical, Metal, and Mining and Mineral applications.

Embodiments of the present disclosure may comprise a special purpose computer including a variety of computer hardware, as described in greater detail herein.

For purposes of illustration, programs and other executable program components may be shown as discrete blocks. It is recognized, however, that such programs and components reside at various times in different storage components of a computing device, and are executed by a data processor(s) of the device.

Although described in connection with an example computing system environment, embodiments of the aspects of the invention are operational with other special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the example operating environment. Examples of computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the present disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the present disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments may be implemented with processor-executable instructions. The processor-executable instructions may be organized into one or more processor-executable components or modules on a tangible processor readable storage medium. Also, embodiments may be implemented with any number and organization of such components or modules. For example, aspects of the present disclosure are not limited to the specific processor-executable instructions or the specific components or modules illustrated in the figures and described herein. Other embodiments may include different processor-executable instructions or components having more or less functionality than illustrated and described herein.

The order of execution or performance of the operations in accordance with aspects of the present disclosure illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the invention.

When introducing elements of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

The above description illustrates embodiments by way of example and not by way of limitation. This description enables one skilled in the art to make and use aspects of the invention, and describes several embodiments, adaptations, variations, alternatives and uses of the aspects of the invention, including what is presently believed to be the best mode of carrying out the aspects of the invention. Additionally, it is to be understood that the aspects of the invention are not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

It will be apparent that modifications and variations are possible without departing from the scope of the invention defined in the appended claims. As various changes could be made in the above constructions and methods without departing from the scope of the invention, it is intended that all matter contained in the above description and shown in the accompanying drawings shall be interpreted as illustrative and not in a limiting sense.

In view of the above, it will be seen that several advantages of the aspects of the invention are achieved and other advantageous results attained.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

What is claimed is:

1. An Ethernet Advanced Physical Layer (Ethernet-APL) bridge system providing communication between an edge field device and an industrial network, the bridge system comprising:

at least one Ethernet-APL switch; and a plurality of physically separated redundant physical Ethernet-APL 10BaseT1L ports coupled to the at least one switch, the redundant ports connecting the field device to the industrial network via the at least one switch to enable a local operation of the field device, wherein each redundant port has a unique Ethernet address enabling load between the field device and physically separated networks to be actively distributed among the plurality of redundant ports, and wherein in response to a failure of one of the plurality of redundant ports, the field device is capable of continuing the local operation by receiving a load of a failed port of the plurality of the redundant ports through at least one other one of the redundant ports due to the port redundancy.

2. The Ethernet-APL bridge system of claim 1, wherein the at least one switch supplies Power over Data Lines (PoDL) to each of the redundant ports.

3. The Ethernet-APL bridge system of claim 1, further comprising one or more of a network port, a cable, and an on-board network interface component coupled to each of the redundant ports.

4. The Ethernet-APL bridge system of claim 1, wherein each redundant port connects to the at least one switch via two-wire intrinsically safe Ethernet (2-WISE) 10BaseT1L.

5. The Ethernet-APL bridge system of claim 1, wherein each of the redundant ports comprises either an active standby port on Ethernet-APL 10BaseT1L Single Pair Ethernet (SPE) with fast failover or a passive standby port on Ethernet-APL 10BaseT1L SPE with failover.

6. The Ethernet-APL bridge system of claim 1, further comprising a processor executing at least one of an Active-Active software configuration and an Active-Passive software configuration.

7. The Ethernet-APL bridge system of claim 6, wherein the Active-Active software configuration, when executed, provides zero fail-over time and load balancing among the redundant ports.

8. The Ethernet-APL bridge system of claim 6, wherein the Active-Passive software configuration, when executed, defines one of the redundant ports as a passive port acting as a Hot Standby and provides a minimum failover time.

9. A field device comprising:

a controllable element for performing a local operation; and a plurality of physically separated redundant physical Ethernet-APL 10BaseT1L ports coupled to at least one Ethernet-APL switch, the redundant ports connecting the field device to an industrial network via the at least one switch to enable the local operation of the field device, wherein each redundant port has a unique Ethernet address enabling load between the field device and physically separated networks to be actively distributed among the plurality of redundant ports, and wherein in response to a failure of one of the plurality of redundant ports, the field device is capable of continuing the local operation by receiving a load of a failed port of the plurality of the redundant ports through at least one other one of the redundant ports due to the port redundancy.

10. The field device of claim 9, wherein the at least one switch supplies Power over Data Lines (PoDL) to each of the redundant ports.

11. The field device of claim 9, further comprising one or more of a network port, a cable, and an on-board network interface component coupled to each of the redundant ports.

12. The field device of claim 9, wherein each redundant port connects to the at least one switch via two-wire intrinsically safe Ethernet (2-WISE) 10BaseT1L.

13. The field device of claim 9, wherein each of the redundant ports comprises either an active standby port on Ethernet-APL 10BaseT1L Single Pair Ethernet (SPE) with fast failover or a passive standby port on Ethernet-APL 10BaseT1L SPE with failover.

14. The field device of claim 9, further comprising a processor executing at least one of an Active-Active software configuration and an Active-Passive software configuration.

15. The field device of claim 14, wherein the Active-Active software configuration, when executed, provides zero fail-over time and load balancing among the redundant ports.

16. The field device of claim 14, wherein the Active-Passive software configuration, when executed, defines one of the redundant ports as a passive port acting as a Hot Standby and provides a minimum failover time.

17. A method of providing high availability and load distribution in an intrinsically safe edge field device communicating with an industrial network, the method comprising:

connecting the field device to a plurality of physically separated redundant Ethernet Advanced Physical Layer (Ethernet-APL) ports, wherein each redundant port has a unique Ethernet address;

actively distributing load between the field device and physically separated networks among the plurality of redundant ports via the unique Ethernet address of each redundant port;

coupling each of the redundant ports to the industrial network via at least one Ethernet-APL switch;

enabling a local operation of the field device; and in response to a failure of one of the plurality of redundant ports, continuing the local operation of the field device by receiving a load of a failed port of the plurality of the redundant ports through at least one other one of the redundant ports due to the port redundancy.

18. The method of claim 17, further comprising executing at least one of an Active-Active software configuration and an Active-Passive software configuration, wherein the Active-Active software configuration, when executed, provides zero fail-over time and load balancing among the redundant ports and the Active-Passive software configuration, when executed, defines one of the redundant ports as a passive port acting as a Hot Standby and provides a minimum failover time.

* * * * *